United States Patent [19]
Wark et al.

[11] Patent Number: 5,833,126
[45] Date of Patent: Nov. 10, 1998

[54] APPARATUS AND METHOD FOR RESURFACING MILL COMPONENTS

[75] Inventors: Rickey E. Wark, Longview, Tex.; Carl J. Myer, Columbus, Mich.

[73] Assignee: Sure Alloy Steel, Inc., Madison Heights, Mich.

[21] Appl. No.: 715,306

[22] Filed: Sep. 18, 1996

Related U.S. Application Data

[63] Continuation of Ser. No. 492,650, Jun. 20, 1995, abandoned.

[51] Int. Cl.⁶ .................................................. B23K 37/02
[52] U.S. Cl. ................................ 228/7; 228/25; 228/119; 29/402.18; 219/76.14; 219/125.1
[58] Field of Search ................................ 228/7, 12, 119, 228/25; 219/124.1, 125.1, 76.14; 29/402.18

[56] References Cited

U.S. PATENT DOCUMENTS

| | | | |
|---|---|---|---|
| 3,216,641 | 11/1965 | Brems | 228/7 |
| 3,254,192 | 5/1966 | Braucht | 219/76.14 |
| 3,795,785 | 3/1974 | Smith | 219/76.14 X |
| 4,149,061 | 4/1979 | Mort et al. | 219/76.14 |

OTHER PUBLICATIONS

Joint Declaration dated Oct. 21, 1996 3 pages — including photograph.

*Primary Examiner*—Kenneth J. Ramsey
*Attorney, Agent, or Firm*—Young & Basile, P.C.

[57] ABSTRACT

An apparatus for repairing curved grinding surfaces in bowl mill coal pulverizers by welding hardfacing material onto the grinding ring surface. The inventive apparatus includes novel guide structure imparting an arcuate motion to the welding torch as it traverses the grinding surface. In a preferred form a welding torch is pivotally mounted about an axis at or near the center of curvature of the grinding surface, pivoted along the circumference of the curved grinding surface to effect welding repairs. The pivotal positioning and motion of the welding torch assures a constant distance and angle relative to the grinding surface, and thus a strong, primary, non-overlapping weld bond across the entire width of the ring. In a preferred form the apparatus employs dual, independently adjustable, simultaneously indexed torch heads. In a further aspect the invention includes a novel positioning device for initial placement of the welding torch, adjustable to accommodate wear to certain portions of the grinding ring on which it rests.

15 Claims, 5 Drawing Sheets

INCREMENTS

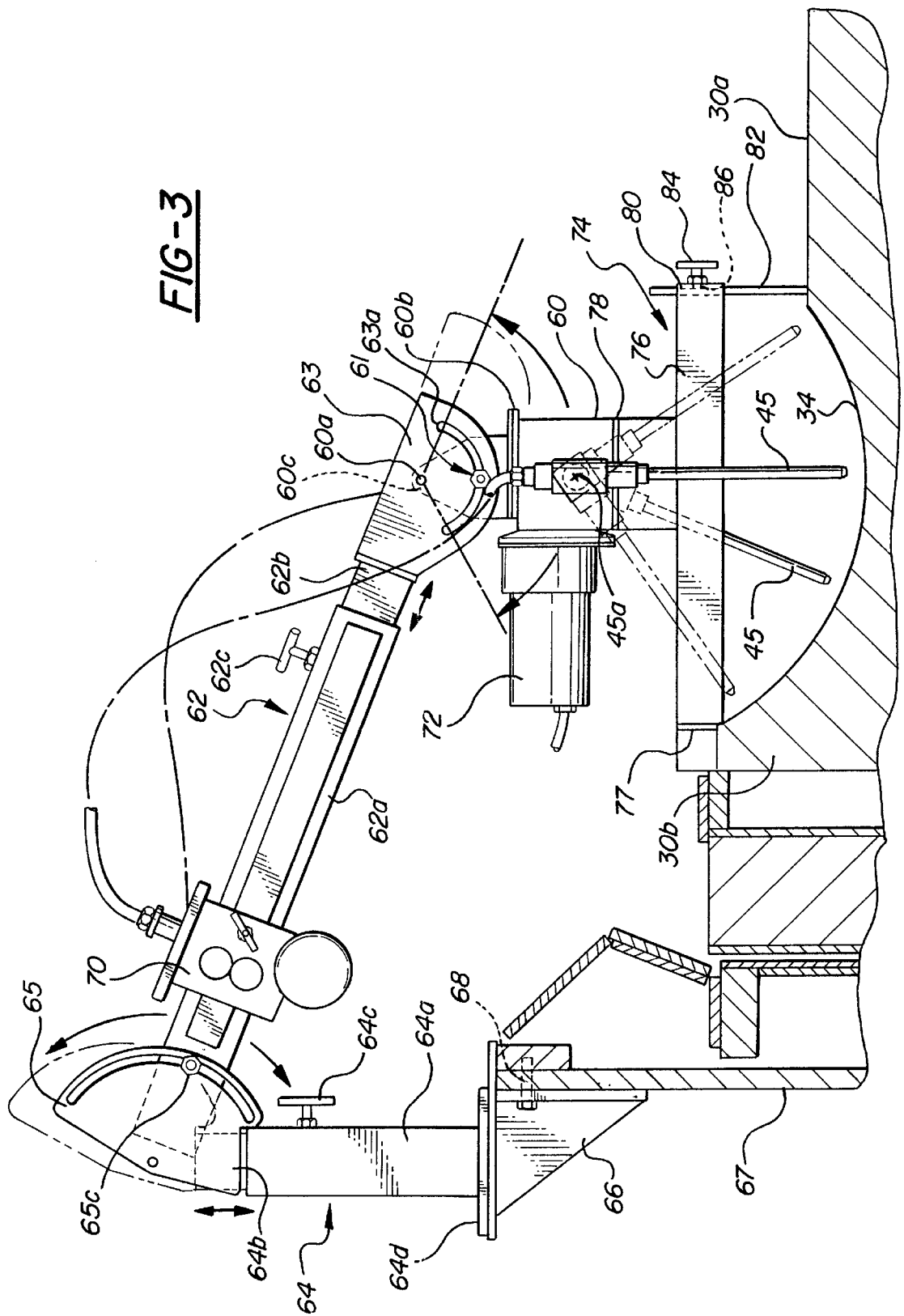

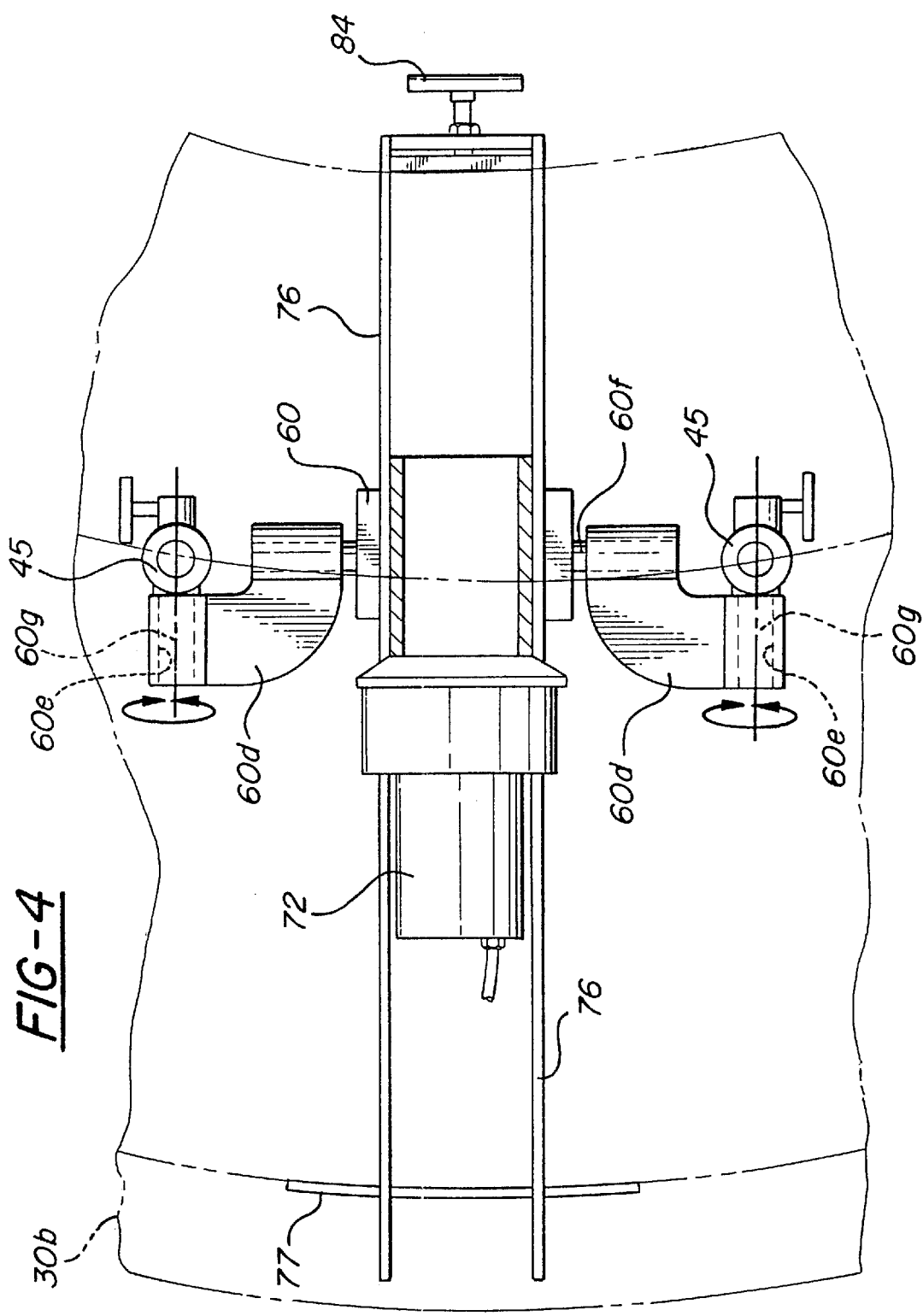

APPARATUS AND METHOD FOR RESURFACING MILL COMPONENTS

This application is a continuation of application Ser. No. 08/492,650 filed on Jan. 20, 1995, now abandoned.

FIELD OF THE INVENTION

The present invention is in the field of welding apparatus for resurfacing the grinding face of bowl mill type pulverizers.

BACKGROUND OF THE INVENTION

Roller- or bowl-type mills for coal pulverizers generally take one of two forms: "journal" mills which have a flat grinding ring surface on which a cylindrical grinding roller operates; and "tire" mills in which the grinding surface is formed as a radial or curved depression in which a tire-like roller operates.

The abrasive grinding action of the rollers at the mill face tends to wear out the grinding surface formed in the mill castings, making it rough and uneven and reducing efficiency and control over the grinding process. One known technique for repairing worn, damaged or uneven areas on the mill face is to resurface the mill face using a welding torch and suitable hardfacing material, building up a hardened weld surface or "bead" on the damaged portion of the mill face. For journal-type mills with flat grinding faces, a welding torch is commonly mounted on a transverse support arm and translated back and forth across the grinding surface as the mill rotates to re-surface it. This sort of linear translation does not work well for tire-type grinding rings, for the reason that the linear motion torch cannot follow the curved surface to apply a repair weld.

It is desirable to maintain a primary bond with the mill face metal and/or previously hardened weld substrate, rather than a secondary bond with just-welded material from the previous pass. With curved grinding surfaces, however, the weld tends to deteriorate from a perpendicular, primary weld to an increasingly secondary, overlapping weld as the operating tip of the welding torch moves from the center of the curved grinding surface across the increasingly angled or curved sides.

Other problems include the tendency of the weld material, which typically lacks "fast freeze" characteristics, to run down the sides of the mill face and over previous welds as the angle increases; and increasingly uneven spacing of successive weld beads as the torch is periodically indexed across the increasingly curved sides, usually by automatic limit switch apparatus activated once per revolution of the circular mill face.

SUMMARY OF THE INVENTION

The present invention generally resides in an apparatus for moving a resurfacing weld torch across a curved grinding surface such that the uniformity and primary nature of the weld are maintained across the entire surface. This is generally achieved by providing structure to guide the welder in a motion following the contour of the grinding surface.

In one form of the invention a vertical, horizontally translated welding torch is connected by a follower to a cam guide rail which mimics the contours of the grinding face. This arrangement automatically raises and lowers the torch as it moves across the grinding surface to maintain a relatively constant spacing with the surface, thereby improving control over the placement of the weld bead. This apparatus is best suited for relatively shallowly curved or angled mill faces, on the order of 20°–30° or less.

In a preferred form of the invention suited for even steeply curved surfaces, apparatus is provided for pivotally mounting a welding torch adjacent the curved grinding surface such that the torch and the resulting weld bead remain essentially perpendicular to the curved surface under repair. This results in a strong, primary weld bead across the entire grinding surface, with reduction of overlap/overflow due to uneven spacing or gaps between successive weld beads in a given weld layer.

In a preferred form the welding torch is pivotally mounted at the center of the radius of curvature of the grinding surface on an adjustable support arm. In a further preferred form the adjustable support arm and/or the pivot structure for the welding torch include multiple linear and rotational adjustments.

The support arm for the pivoting torch structure is preferably removably connected with a novel mounting bracket to an outer, easily-accessed portion of the mill, for example a mill wall radially outward of the grinding ring.

The invention in a further form includes a saddle device which is used to accurately position the pivotal welding torch in proper relation to the grinding surface. In one form the saddle device comprises a vertically adjustable cross member with an aperture for the welding torch, and a seat for the pivoting support structure for the welding torch.

In another form the invention includes two or more independently adjustable welding torches supported for simultaneous indexing relative to the grinding surface. This arrangement reduces resurfacing time, and helps the user avoid premature overlap of the welds produced by each welding device.

These and other advantages of the present invention will become apparent upon further reading of the specification.

BRIEF DESCRIPTION OF THE DRAWINGS

FIG. 3 is a side view of a resurfacing welder according to a second and preferred embodiment of the present invention for tire-type mills;

FIG. 4 is a plan view of a portion of the welder of FIG. 3; and,

DETAILED DESCRIPTION OF THE ILLUSTRATED EMBODIMENT

Figure 1:
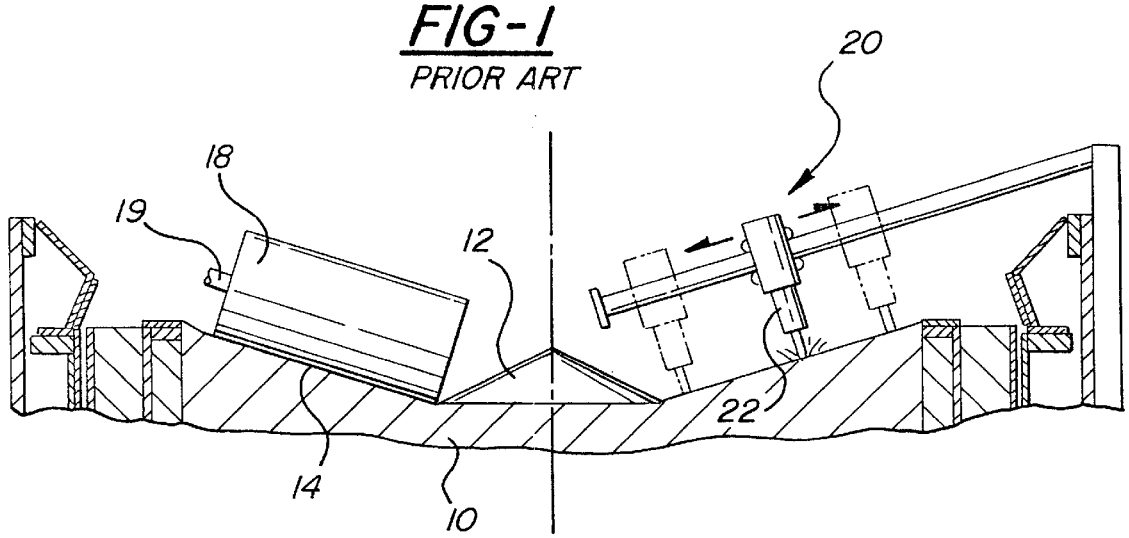
FIG. 1 is a schematic illustration of a journal-type mill with a roller structure on one side and a prior art linear resurfacing welder on the other.

FIG. 1 schematically illustrates the grinding portion of a journal type mill 10 commonly used for coal pulverizing.

Coal is delivered by a feed pipe (not shown) to angled diverter 12, from which it is directed onto the ring-shaped grinding surface 14 of the mill. Grinding surface 14 is often formed from a ring shaped, segmented array of mill castings, for example inserts cast from a suitable wear-resistant metal.

A cylindrical journal type grinding roller 18 is mounted to rotate on a fixed support shaft 19 immediately adjacent grinding surface 14. As grinding surface 14 rotates in circular fashion past stationary roller 18, coal diverted onto grinding surface 14 from diverter 12 is ground or crushed in the space between roller 18 and the grinding surface. The fineness of the grinding operation depends on the spacing between roller 18 and grinding surface 14. Uniform spacing across the grinding surface produces uniformly pulverized coal, a desirable result.

For economy of illustration a prior art linear resurfacing welder 20 is simultaneously shown in FIG. 1 in its operative position relative to grinding surface 14. The abrasiveness of the coal grinding operation takes its toll on the grinding surface 14, causing wear and unevenness which results in a loss of efficiency and control over the grinding operation. Such damage is repaired as often as possible by resurfacing damaged portions of grinding surface 14. It is often desirable to resurface by welding a "hardfacing" material onto the grinding surface, rather than replacing the entire cast insert. With the journal type roller mill 10 of FIG. 1, a linear motion welder 20 in which the welding torch 22 is translated parallel to the flat grinding surface is satisfactory. As the mill rotates, the welder draws a string-like weld bead on the grinding surface, and is laterally indexed one bead thickness per revolution until the repair is complete.

Figure 1A:
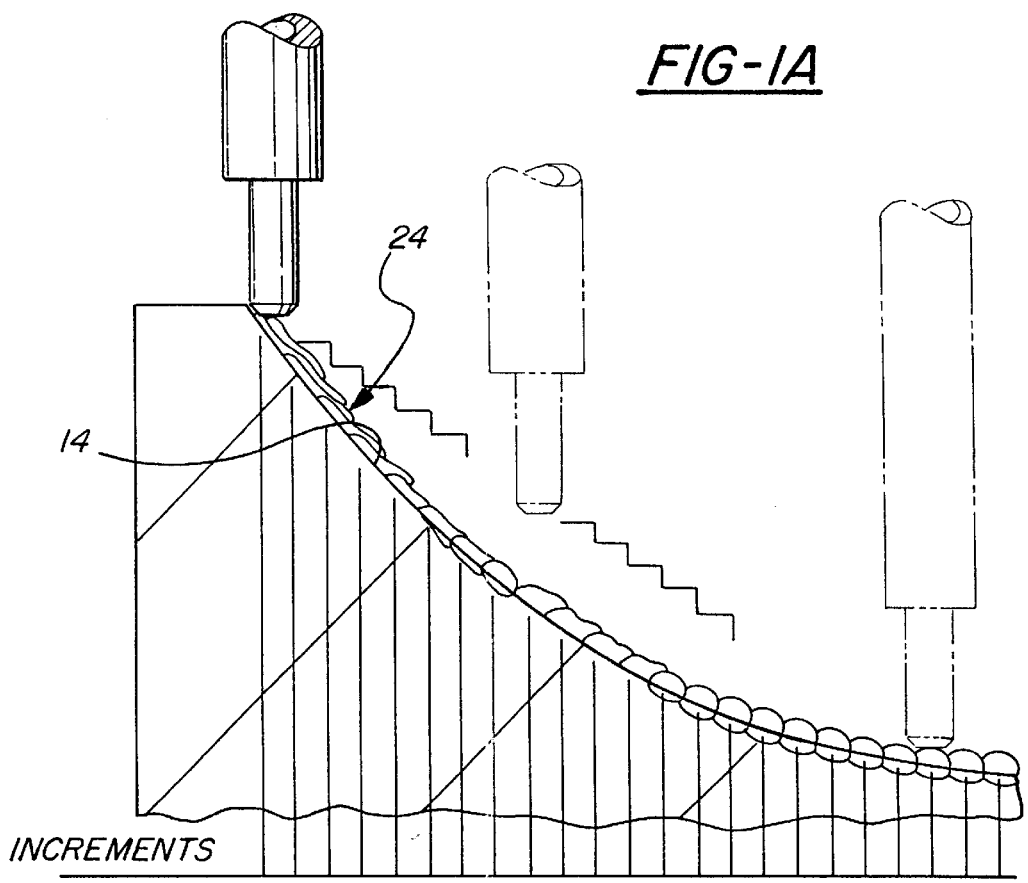
FIG. 1a is a schematic illustration of an undesirable weld surface produced on a curved grinding face.

Referring to FIG. 1a, a curved grinding surface 14 is shown in detail. An undesirable weld bead surface produced by prior art welding methods and apparatus on curved or angled grinding surfaces is illustrated in schematic fashion at 24. The prior art methods are generally undesirable for several reasons.

First, there may be portions of the grinding surface spaced so far from a linear welding torch of the type in FIG. 1 that no weld takes place.

Also, a common method for compensating for curved grinding surfaces involves a manual or motor-driven vertical adjustment of the welding torch as it is indexed across the ring, performed or actuated by the operator on each pass. Even with direct operator involvement, however, the resurfacing procedure is delicate enough that inaccurate placement of successive weld beads, by amounts as small as fractions of a bead thickness, can seriously affect the integrity of the welding repair. Ideally, each successive weld bead is placed at the edge of the preceding weld bead. The greater the welding angle, the greater the tendency to weld over a previous weld bead, creating an ineffective secondary bond. The relatively slow freezing material tends to run under gravity over previous welds and down the sides of the grinding surface, creating unsightly, uneven and ineffective streaks of material. Additionally, it is common for the welding torches to be indexed the thickness of a weld bead once per revolution of the grinding surface, for example by a limit switch arrangement. As the angle or curvature of the grinding surface increases for each successive weld bead indexing step, the constantly-indexed welding torch places the beads with gaps between them, amplifying the streaking problem as illustrated.

In short, linearly-indexed prior art welders of the type illustrated in FIG. 1 and operator-estimated vertical adjustment methods are generally unsatisfactory on curved grinding surfaces.

Figure 2:
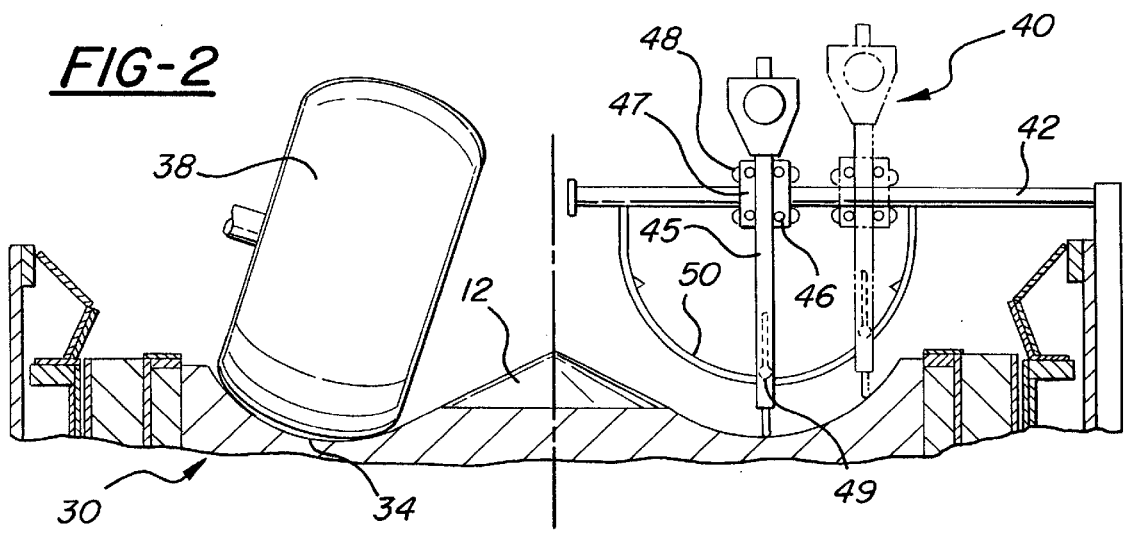
FIG. 2 is a schematic illustration of a tire-type mill showing a roller on one side and an arcuate resurfacing welder according to a first embodiment of the invention on the other.

Referring now to FIG. 2, the grinding portion of a tire type coal pulverizing mill 30 is schematically illustrated. Incoming coal delivered by gravity feed from feed pipe structure (not shown) is diverted at 12 to the curved grinding surface 34, defined for example by a number of cast inserts interlocked to define a segmented ring-like grinding surface 34. A tire type roller 38 is positioned to rotate immediately adjacent the curved grinding surface 34, crushing or grinding coal therebetween in the manner described above.

In response to the need for welding apparatus to resurface such curved grinding surfaces, an arcuate motion welder illustrated at 40 in FIG. 2 is provided in accordance with a first embodiment of the present invention. Arcuate motion welder 40 includes a linear support arm 42, and a vertical torch 45 movable back and forth on rail 42 and up and down via rollers 46, 48 on a torch carriage 47. The lower end of torch 45 is provided with an additional roller guide 49 which is trapped to travel along an arcuate guide rail 50 depending from support arm 42. As torch 45 is driven back and forth horizontally along rail 42 by suitable motor apparatus (not shown), roller guide 49 forces torch 45 up and down as it travels along the cam-like rail guide 50. This arrangement maintains a constant spacing between the tip of torch 45 and the curved grinding surface. By matching the curvature of arcuate guide 50 to the curvature of grinding surface 34, torch 45 can produce a relatively uniform resurfacing weld bead across the entirety of the curved grinding surface. It will be understood that the dimensions of the structure shown in FIG. 2 may be exaggerated for economy of illustration. Rail 50 can be formed to follow virtually any surface contour, and will usually be custom fit to a particular mill.

Figure 2A:
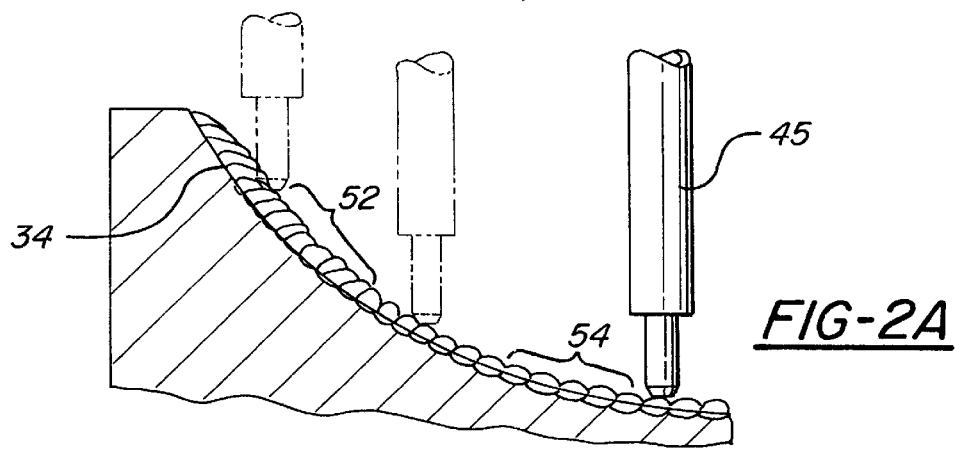
FIG. 2a is a detailed view of the welder/grinding ring interface in FIG. 2, schematically illustrating a desirable weld surface formed by the resurfacing welder of FIG. 2.

FIG. 2A illustrates the relationship of the tip of torch 45 to curved grinding surface 34 across its range of travel, along with the resulting welding bead 52, 54. At the center of grinding surface 34 the vertical torch 45 (solid lines) and the grinding surface are essentially perpendicular to one another. As torch 45 is linearly indexed from the center across the increasingly curved sides of the grinding surface to its outer edge, the angle between the grinding surface and the vertical torch progressively increases. Looking at FIG. 2A, as the welding torch 45 is indexed leftward from the central position shown in solid lines to those in phantom, automatic lateral indexing a fixed distance per revolution of the grinding ring would result in an increasing gap between the welding beads as the torch moves across the increasingly curved sides. This in turn results in an increasing tendency of the weld material to run, rather than being "dammed" at the edge of the previous weld bead. Coupled with the slow freeze characteristics of the welding material, the result would be an unsatisfactory weld in the curved regions of the grinding surface as shown in FIG. 1A.

As illustrated schematically in FIG. 2A, the lateral index distance of welding torch 45 is preferably decreased as the torch moves progressively outward to the increasingly curved side regions. This can be accomplished automatically, for example with suitable limit switch and automatic control structure, or can be performed manually by an operator viewing the welding operation through a protective hood. In either case the lateral adjustment, coupled with the contour-following arcuate guidance, is easier and produces more satisfactory results than with the vertical estimation/compensation methods and apparatus of the prior art.

Referring still to FIG. 2A, in the center region where grinding surface and torch are essentially perpendicular, a high quality "primary" weld bead is generated as shown at 54, welded entirely to the grinding ring. As the curvature of the grinding surface and its angle with the vertical torch increases, the weld bead 52 tends toward a "secondary" bond or weld in which the material is bonded to the previous weld, rather than the underlying grinding surface shown at 34. The above-described adjustment of the rate of lateral index helps reduce this problem. It can be seen that careful placement has allowed a substantial portion of the weld beads higher up the curved face to form a primary bond with the grinding surface, and further has allowed the previous weld beads to provide a desirable "damming" effect to prevent freshly-strung beads from flowing down over previous beads. As a general rule the beads are satisfactory if the bond is largely primary and no more than a third of the previous bead is overlapped. The apparatus of FIG. 2 is therefore best suited for relatively shallowly curved grinding surfaces, as increasing steepness aggravates problems for which even lateral indexing adjustments may not compensate after a certain point.

FIG. 3 illustrates a preferred welding apparatus for resurfacing even steeply curved grinding faces in tire type bowl mill pulverizers according to the present invention. At least one welding torch 45, comprising a commercially available torch and operating in a manner known to those skilled in the art, is positioned relative to curved grinding surface 34 by pivot mounting structure 60 connected to adjustable horizontal and vertical support arms 62, 64. The entire assembly is connected by a novel mounting bracket 66 to an outer portion of the pulverizer structure, in the illustrated embodiment mill wall 67, with suitable bolt structure 68.

Welding torch 45 pivots around an axis 45a on suitable shaft and bearing structure. In the illustrated embodiment pivot axis 45a is preferably located at or near the center of the radius of curvature of grinding surface 34.

The pivoting nature of the apparatus in FIG. 3 is best suited to grinding surfaces having a relatively constant radius of curvature. This can be the entire grinding surface as illustrated, or portions having a relatively constant radius of curvature. The pivot structure 60 on which torch 45 is mounted is itself rotatably connected to horizontal support arm 62 at 60a to an arcuate guide bracket 63. Pivot structure 60 can be locked in a desired position with a follower bolt 61 in guide slot 63a.

Horizontal support arm 62 includes telescoping sleeve and post sections 62a, 62b selectively locked together with locking bolt 62c. At its opposite end support arm 62 is in turn rotatably connected to vertical support 64 by arcuate guide bracket 65 in a manner similar to pivot structure 60 on guide bracket 63. Vertical support 64 includes telescoping post and sleeve structure 64a, 64b selectively locked together with locking bolt 64c.

A wire feeder 70 of known type is slidably mounted on the outer sleeve portion 62a of horizontal support 62, supplying welding material in wire form to torch 45 in known fashion. A torch drive motor 72 is attached to pivot structure 60, and operates to adjust the position of torches 45 in a manner described below.

The various linear and rotational adjustments afforded by the pivot mounting of welding torches 45, arcuate guide bracket 63, arcuate guide bracket 65, and telescoping support arms 62 and 64 greatly aid the operator in properly positioning torch 45 and its pivot axis 45a relative to grinding surface 34.

An inventive saddle 74 provides additional aid in positioning torch 45. As best shown in FIGS. 3 and 4, saddle 74 comprises parallel horizontal bars 76 joined by a curved crosspiece 77 at the outer end matching the curvature of the mill, a raised saddle plate 78 between the ends for seating pivot structure 60, and a vertical, rectangular sleeve 80 at the inner end. Vertical adjustment sleeve 80 accepts a sliding vertical adjustment leg 82, in the illustrated embodiment a rectangular bar. A hand-operated lock screw 84 passes through an aperture 86 in sleeve 80 to frictionally lock saddle 74 and leg 82.

Saddle 74 is built specifically for a grinding ring of particular dimensions; accordingly, different saddle dimensions may be required for grinding ring structures from different manufacturers or in different models or sizes. The illustrated saddle is formed from welded steel plate and bar, although other materials can be used.

Saddle 74, then, is a premanufactured centering mechanism which is used to properly position welding torches 45 before tightening or locking the various adjustment mechanisms at 61, 62c, 64c, and 65c on the vertical and horizontal support arms. The saddle is then removed for the resurfacing operation.

The height adjustment provided at the inner end of saddle 74 with leg 82 compensates for damage to the inner region 30a of the grinding ring caused by a concentration of heavy or hard debris in the coal feed from the diverter (FIG. 2) to the ring. While the outer end or edge 30b of the grinding ring is a relatively thick, solid region, inner end 30a is often thin and further includes a number of fastener holes which structurally weaken it and make it prone to chipping and similar damage by such debris.

Additional adjustments are provided at vertical support 64 and the pivoting gear box 60, each of which has a range of horizontal rotation. The vertical support has a base plate 64d which rotates on the mounting bracket 66. The gear box rotates on plate 60b supported from pivot flange 60c relative to the horizontal support arm.

Figure 5:
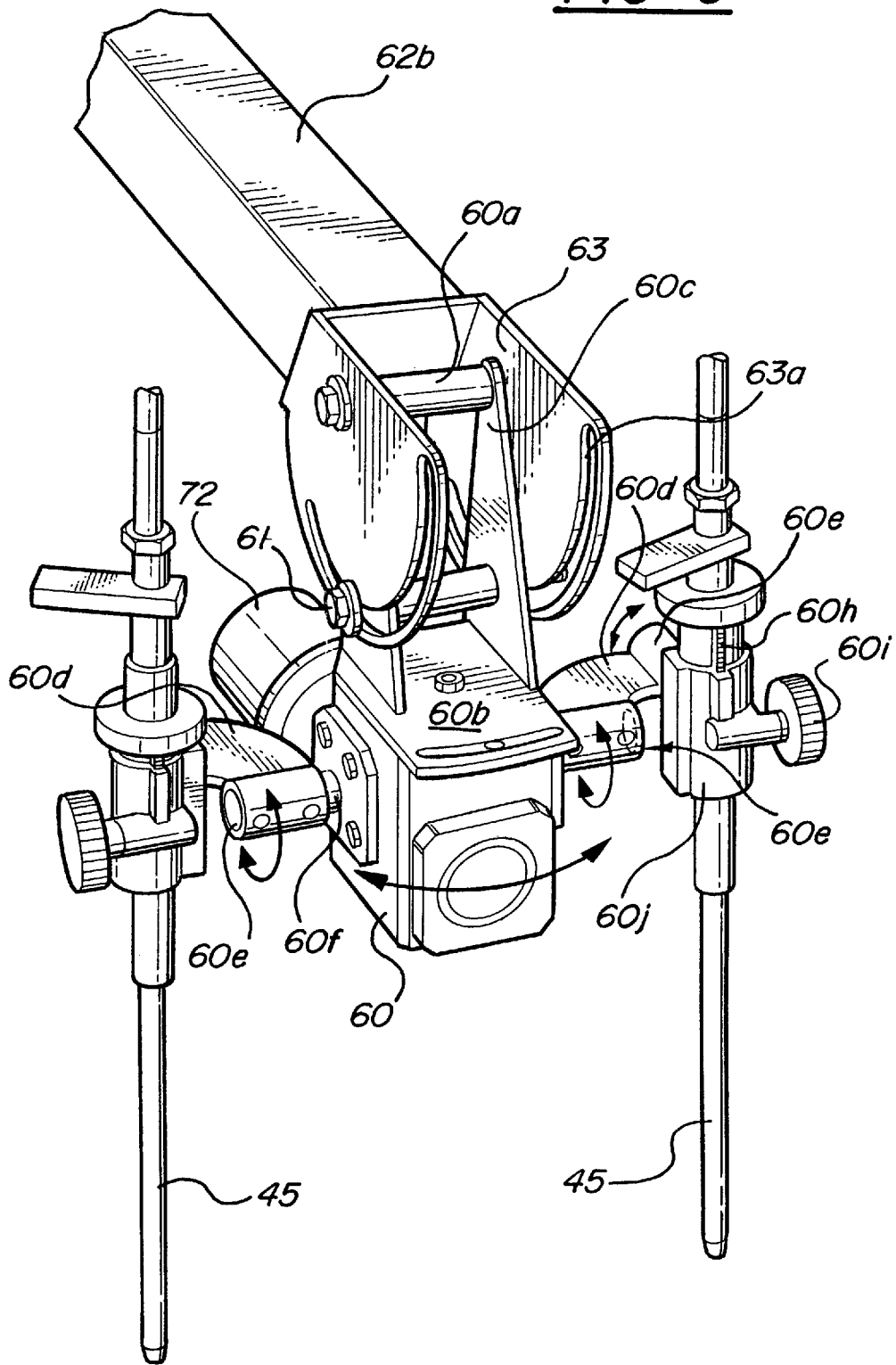
FIG. 5 is an end perspective view of a portion of the welder of FIG. 3.

As shown in the illustrated embodiment, particularly at FIGS. 4 and 5, it is preferred to use a dual torch arrangement, with one torch 45 on each side of gear box 60. Each torch is supported by swiveling elbows 60d having bores 60e containing drive shaft 60f and torch shaft 60g. Torches 45 are rotationally locked to drive shaft 60f by bolts and can be selectively loosened for angular adjustment relative to one another, then locked to shaft 60f for simultaneous indexing by the torch drive motor 72.

An additional measure of adjustment is provided for each torch 45 by rack and pinion structure 60h, 60i to adjust each torch 45 vertically in sleeve 60j.

Before the start of the resurface welding, torches 45 are positioned to pivot at or near the center of curvature of grinding surface 34 by leveling saddle 74 and placing pivot mounting gear box 60 on saddle plate 78. For this positioning procedure the various adjustment locking mechanisms such as 61, 62c, and 64c are selectively loosened and tightened in a manner that will be understood by those skilled in the art.

Once torch heads 45 have been properly positioned using saddle 74, and the various adjustment mechanisms such as brackets 63 and 65 have been locked in place, the saddle is removed and grinding ring 34 is rotated at a pre-determined speed past the stationary torches. Limit switch structure (not shown) located on the mill adjacent to the grinding ring is activated once per revolution of the ring to provide a control signal to the torch drive motor 72. Motor 72 then indexes the torch heads simultaneously, for example one weld bead width radially inward or outward. In this manner the entire grinding ring surface 34, or any portion thereof, can be resurfaced by welding using the technique known as "stringer bead welding".

Figure 3A:
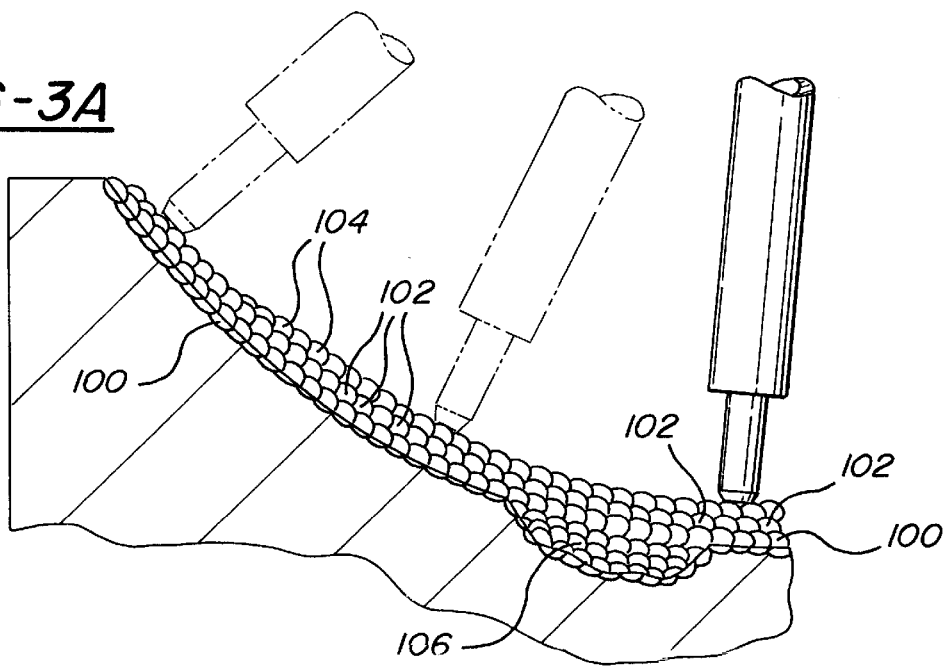
FIG. 3a is a detailed view of the welder/grinding ring interface in FIG. 3, schematically illustrating a desirable weld surface formed by the welder in FIG. 3.

As welding torches 45 are indexed about their pivot axis 45*a*, for example one bead thickness per mill revolution, a constant distance and angle is maintained between the tip of the welding torch and the grinding surface 34 across the width thereof. As a result, all welds form a primary, largely non-overlapping bond with the underlying grinding ring material or hardened weld substrate for a strong, uniform repair. Referring to FIG. 3A, for example, several layers of rewelded surface are shown schematically as they would be produced by the welding apparatus of FIG. 3. It is common for welding repairs to comprise many built up layers of weld beads, sometimes as much as three inches thick depending on the needed repair. In FIG. 3A there is a first layer of weld beads 100, all with a primary bond to the grinding ring surface. The initial layer 100 is covered with succeeding layers 102, 104, whose primary bond is to the previously-hardened substrate of layers 100 and 102, respectively. A primary bond between layers of welding material can be achieved as long as the underlying layer has been allowed to harden or "freeze". It is clear from FIG. 3*a* that the bonding of all weld beads, even those on the relatively steeply curved sides of the grinding ring, are substantially primary bonds to the underlying substrate, and further exhibit reduced overlap or overflow in the curved side regions where gravity tends to draw the slow freezing welding material down towards the center of the grinding ring.

The amount of repair needed across the grinding surface is not always uniform. The center of the grinding surface often suffers the greatest wear, with the potential need for extra thickness 106 of welding material as shown in FIG. 3A. The arc of the welder according to the present invention can accordingly be abbreviated to fill in such low spots until the grinding surface/repair substrate is even enough to receive a full layer across the entire width of the grinding ring.

The removable mounting of the welding mechanism to the mill via mounting bracket 66, the multiple adjustments, and the selected indexing of the torch heads lend the invention to a variety of differently sized or shaped grinding rings, as well as repair of selected portions of a grinding ring surface.

The foregoing is an illustrative embodiment of the invention, and is not intended to be limiting beyond the scope of the appended claims.

Accordingly, we claim:

1. An apparatus for resurfacing a curved grinding surface in a bowl mill type pulverizer, comprising:

a resurfacing welder mounted adjacent the grinding surface for traversing the grinding surface as the grinding surface rotates, and guide means associated with the welder, the guide means imparting an arcuate motion to the welder matching the contour of the curved grinding surface to maintain an essentially constant distance between the welder and the grinding surface.

2. Apparatus as defined in claim 1, wherein the guide means comprise pivot means defining a pivot point for the welder located at or near a center of curvature of a portion of the grinding surface to be repaired.

3. Apparatus as defined in claim 2, wherein the welder and pivot means are removably mounted on a portion of the mill radially outward of the grinding surface.

4. Apparatus as defined in claim 3, wherein the pivot means and welder are connected to a mounting bracket which can be removably connected to a wall of the mill.

5. Apparatus as defined in claim 2, further including saddle means for positioning the pivot means and welder relative to the grinding surface.

6. Apparatus as defined in claim 5, wherein the saddle means comprise a vertically adjustable transverse support having a seat for the pivot structure.

7. Apparatus as defined in claim 2, wherein the pivot means is supported from an adjustable support arm removably connected to an outer portion of the mill.

8. Apparatus as defined in claim 7, wherein the support arm includes vertical, transverse and arcuate adjustments.

9. Apparatus as defined in claim 8, wherein the pivot means includes arcuate tilting and rotating adjustments.

10. Apparatus as defined in claim 2, wherein the pivot means supports two independently adjustable and simultaneously indexed welders.

11. Apparatus as defined in claim 1, wherein the guide means comprises follower means matching the contour of a portion of the grinding surface to be repaired.

12. Apparatus as defined in claim 11, wherein the follower means comprises a guide rail matching the contour of at least a portion of the grinding surface, and a follower connecting the welder to the guide rail such that the welder follows the guide rail as it moves laterally along the support arm.

13. An apparatus for resurfacing a curved grinding surface in a bowl mill type pulverizer, comprising:

a resurfacing welder mounted adjacent the grinding surface for traversing the grinding surface as the grinding surface rotates;

pivot mounting structure for mounting the welder to pivot about an axis at or near the center of curvature of a portion of the grinding surface to be resurfaced;

adjustable support structure for supporting the pivot mounting structure, the adjustable support structure including vertical, horizontal and rotational adjustment mechanisms; and means for removably mounting the adjustable support structure to a portion of the mill radially outward of the grinding surface.

14. An apparatus as defined in claim 13, wherein the pivot mounting structure supports two independently adjustable and simultaneously indexed resurfacing welders.

15. An apparatus for resurfacing a curved grinding surface in a bowl mill type pulverizer, comprising:

a resurfacing welder mounted adjacent the grinding surface for traversing the grinding surface as the grinding surface rotates;

means for moving the welder laterally across the grinding surface;

a guide rail spaced from and matching the contour of at least a portion of the grinding surface;

follower means connecting the welder to the guide rail such that the welder follows the contour of the grinding surface as the welder is moved laterally across the grinding surface.

* * * * *